United States Patent
Jiang et al.

(10) Patent No.: US 9,332,075 B2
(45) Date of Patent: May 3, 2016

(54) DISTRIBUTED NETWORK FIREWALL AND FLOW-BASED FORWARDING SYSTEM

(71) Applicant: Hillstone Networks, Corp., Sunnyvale, CA (US)

(72) Inventors: Dongyi Jiang, San Jose, CA (US); Jin Shang, Saratoga, CA (US); David Yu, San Jose, CA (US); Michael Lin, Cupertino, CA (US); Jun Xie, Sunnyvale, CA (US); Ye Zhang, Sunnyvale, CA (US)

(73) Assignee: Hillstone Networks, Corp., Sunnyvale, CA (US)

( * ) Notice: Subject to any disclaimer, the term of this patent is extended or adjusted under 35 U.S.C. 154(b) by 300 days.

(21) Appl. No.: 13/843,653

(22) Filed: Mar. 15, 2013

(65) Prior Publication Data
US 2014/0280442 A1    Sep. 18, 2014

(51) Int. Cl.
| | | |
|---|---|---|
| G06F 15/16 | (2006.01) |
| G06F 15/173 | (2006.01) |
| H04L 29/08 | (2006.01) |
| H04L 12/773 | (2013.01) |
| H04L 29/06 | (2006.01) |
| H04L 12/725 | (2013.01) |

(52) U.S. Cl.
CPC .......... *H04L 67/1097* (2013.01); *H04L 45/302* (2013.01); *H04L 45/306* (2013.01); *H04L 45/60* (2013.01); *H04L 63/00* (2013.01); *H04L 63/0218* (2013.01); *H04L 63/0236* (2013.01)

(58) Field of Classification Search
CPC ..... H04L 45/302; H04L 45/306; H04L 45/60; H04L 63/0236
USPC .................................. 709/228, 242, 243, 250
See application file for complete search history.

(56) References Cited

U.S. PATENT DOCUMENTS

| | | | |
|---|---|---|---|
| 8,339,959 B1* | 12/2012 | Moisand et al. ............... 370/235 |
| 2009/0003364 A1* | 1/2009 | Fendick et al. ................ 370/401 |
| 2009/0003375 A1* | 1/2009 | Havemann et al. ........... 370/463 |
| 2012/0314608 A1* | 12/2012 | Okuno et al. .................. 370/252 |

\* cited by examiner

*Primary Examiner* — Hieu Hoang
(74) *Attorney, Agent, or Firm* — Vista IP Law Group, LLP (57) ABSTRACT

A method performed by a network appliance having a plurality of application processing units, includes: receiving a first packet at the network appliance; calculating a first value using a mathematical algorithm based on one or more information regarding the first packet; and using the calculated first value to identify a first application processing unit of the plurality of application processing units in the network appliance. A network appliance includes: a plurality of processing units that are communicatively connected to each other; wherein a first processing unit of the plurality of processing units is configured for: calculating a first value using a mathematical algorithm based on one or more information regarding a first packet; and using the calculated first value to identify a second processing unit of the plurality of processing units.

34 Claims, 7 Drawing Sheets

DISTRIBUTED NETWORK FIREWALL AND FLOW-BASED FORWARDING SYSTEM

FIELD

This application relates generally to network security appliances, such as firewalls and security devices, and more specifically, to network security appliances having multiple application processor cards for monitoring networks.

BACKGROUND

Network appliances, such as high end distributed security gateway, have been used for protecting networks from various attacks, intrusions detection and prevention, providing high performance packet routing, and other application services. In some cases, such network appliance may include multiple processing units for performing different packet processing functions. Such processing units may be managed by a centralized CPU, which hosts a centralized database for storing all information for all of the multiple processing units.

Applicant of the subject application has determined that it may be desirable to have a network appliance that uses a distributed database, rather than a centralized database, for processing packets

SUMMARY

A method performed by a network appliance having a plurality of application processing units, includes: receiving a first packet at the network appliance; calculating a first value using a mathematical algorithm based on one or more information regarding the first packet; and using the calculated first value to identify a first application processing unit of the plurality of application processing units in the network appliance. By means of non-limiting examples, the network appliance may be a firewall, a network security gateway, or any of other security devices.

Optionally, the one or more information may comprise one or a combination of a source IP address, a destination IP address, a source port identifier, a destination port identifier, and protocol information.

Optionally, the network appliance may include a plurality of application processing cards, and the plurality of application processing units may be parts of the application processing cards.

Optionally, at least two of the application processing units may be configured to perform different respective packet processing functions.

Optionally, the method may further include retrieving data from the identified first application processing unit based at least in part on a set of information regarding the first packet, the set of information being a superset of the one or more information used to calculate the first value.

Optionally, the set of information for retrieving the data may comprise source IP address, destination IP address, source port, destination port, and protocol information, and wherein the one or more information for identifying the first application processing unit may comprise a subset of the set of information.

Optionally, the act of retrieving data from the identified first application processing unit may comprise retrieving data from a first local database associated with the first application processing unit.

Optionally, the method may further include receiving data from the identified first application processing unit, wherein the act of receiving the data may be performed by a second application processing unit of the plurality of application processing units in the network appliance that is different from the first application processing unit identified using the calculated first value.

Optionally, the application processing units may have respective local databases associated therewith, and the method may further include storing data regarding the first packet at one of the local databases that is associated with the identified first application processing unit.

Optionally, at least one of the local databases may not have a copy of the data.

Optionally, the method may further include: receiving a second packet at network appliance; calculating a second value based on one or more information regarding the second packet; and using the calculated second value to identify a second application processing unit of the plurality of application processing units.

Optionally, the method may further include: retrieving data stored in a local database that is associated with the identified application processing unit; and creating a packet processing session that represents a packet processing plan based at least in part on the retrieved data.

Optionally, the packet processing session may be created by one of the application processing units.

Optionally, the network appliance may also include a plurality of I/O cards, and the method may further comprise storing the packet processing session in a first local database for one of the I/O cards at which the first packet is received.

Optionally, the packet processing session may be stored in a second local database for another one of the I/O cards at which the first packet is egressed.

Optionally, the network appliance may be configured to perform packet processing in either a slow-path configuration or a fast-path configuration, and the act of calculating the first value and the act of using the calculated first value to identify the first application processing unit may be performed while processing the first packet in the slow-path configuration.

A network appliance includes: a plurality of processing units that are communicatively connected to each other; wherein a first processing unit of the plurality of processing units is configured for: calculating a first value using a mathematical algorithm based on one or more information regarding a first packet; and using the calculated first value to identify a second processing unit of the plurality of processing units.

Optionally, the one or more information may comprise one or a combination of a source IP address, a destination IP address, a source port identifier, a destination port identifier, and protocol information.

Optionally, the network appliance may further comprise a plurality of application processing cards, and the plurality of application processing units may be parts of the application processing cards.

Optionally, at least two of the application processing units may be configured to perform different respective packet processing functions.

Optionally, the first processing unit may be configured for retrieving data from the identified second application processing unit based at least in part on a set of information regarding the first packet, the set of information being a superset of the one or more information used to calculate the first value for identifying the second application processing unit.

Optionally, the set of information for retrieving the data may comprise source IP address, destination IP address, source port, destination port, and protocol information, and wherein the one or more information for identifying the second application processing unit may comprise a subset of the set of information.

Optionally, the first processing unit may be configured for retrieving data from the identified second application processing unit by retrieving data from a local database associated with the second application processing unit.

Optionally, the network appliance may further comprise respective local databases associated with the processing units, wherein one of the local databases that is associated with the identified second application processing unit is configured for storing data regarding the first packet.

Optionally, at least one of the local databases may not have a copy of the data.

Optionally, the first processing unit may be configured for: calculating a second value based on one or more information regarding a second packet; and using the calculated second value to identify a third application processing unit of the plurality of application processing units.

Optionally, the first processing unit may be configured for: retrieving data stored in a local database that is associated with the identified second application processing unit; and creating a packet processing session that represents a packet processing plan based at least in part on the retrieved data.

Optionally, the network appliance may further comprise a plurality of I/O cards, wherein the first packet is received at a first one of the I/O cards, and is egressed at a second one of the I/O cards, and wherein the packet processing session is stored in the first one of the I/O cards at which the first packet is received, and in the second one of the I/O cards at which the first packet is egressed.

Optionally, the network appliance may be configured to perform packet processing in either a slow-path configuration or a fast-path configuration, and the first processing unit may be configured to perform the act of calculating the first value and the act of using the calculated first value to identify the second processing unit while processing the first packet in the slow-path configuration.

Optionally, the first processing unit may comprise a first application processing unit, and the second processing unit may comprise a second application processing unit.

Optionally, the first processing unit may comprise a network processing unit in an I/O card, and the second processing unit may comprise an application processor unit in an application processor card.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

Figure 1:
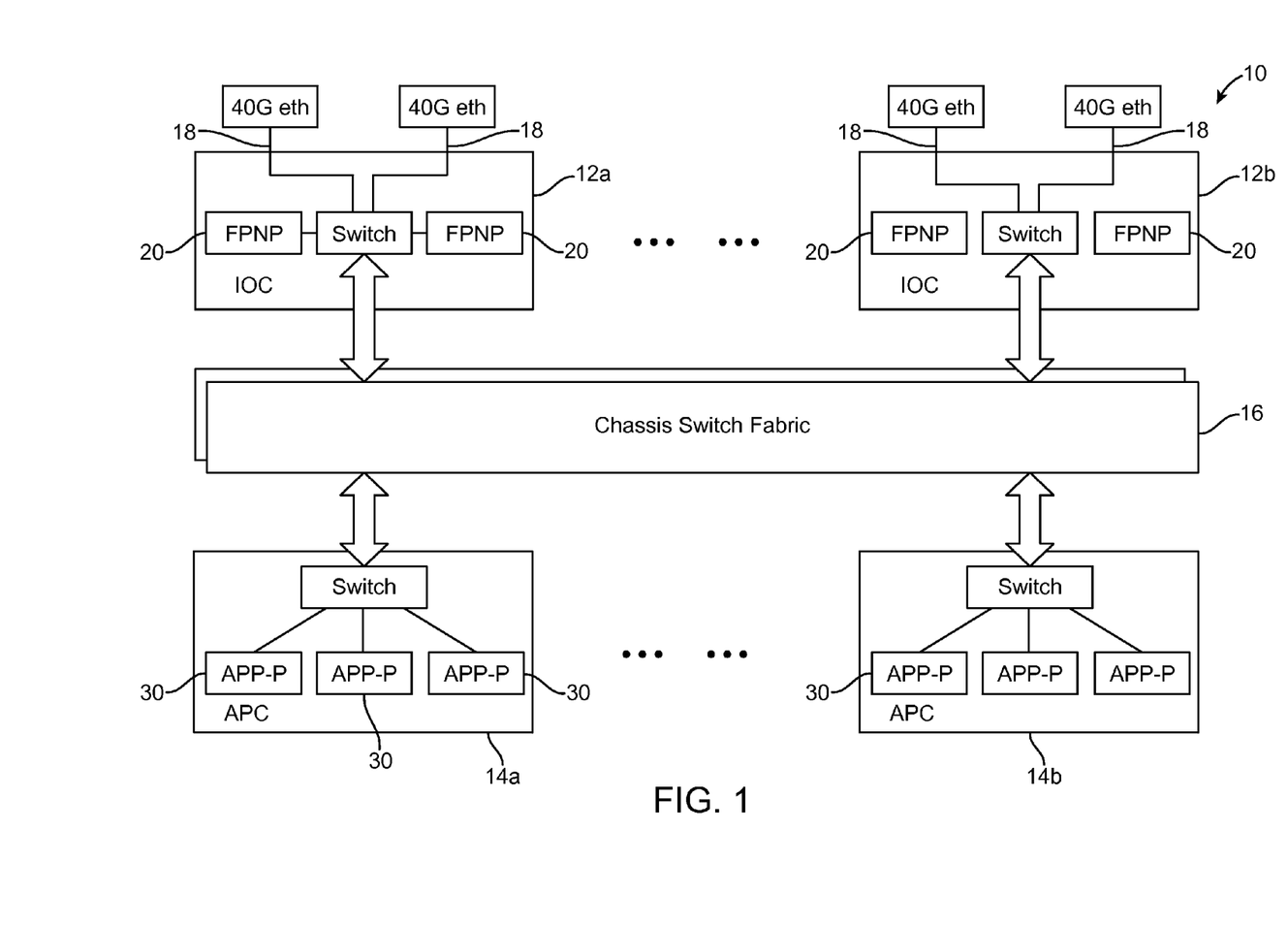
FIG. 1 illustrates a network appliance in accordance with some embodiments.

FIG. 1 illustrates a network appliance 10 in accordance with some embodiments. The network appliance 10 includes a plurality of I/O cards 12a, 12b, a plurality of application processor cards 14a, 14b, and a switch fabric 16 coupling the I/O cards 12 and the application processor cards 14. Each I/O card 12 includes a plurality of network ports 18 configured to receive packets, transmit packets, or both receive and transmit packets. In some embodiments, each I/O card 12 may be a 100 G I/O card. Each I/O card 12 also includes one or more network processing unit 20. The network processing units 20 are communicatively coupled to the network ports 18 via a switch. Alternatively, the switch is optional, and the I/O card 12 may not include the switch. In such cases, the network ports 18 connect directly to the network processing units 20. Although each I/O card 12 is illustrated as having two network processing units 20, it should be understood that an I/O card 12 may have only one network processing unit 20, or more than two network processing units 20. In some embodiments, a network processing unit 20 may be implemented using a processor, such as a network processor, a FPGA, an ASIC, a general purpose processor, etc. Also, in some embodiments, a network processing unit 20 may include hardware, software, or combination of both.

As shown in the figure, each application processor card 14 includes multiple application processing units 30. Each application processing unit 30 is configured to perform one or more network processing function, such as firewall function, network security monitoring (such as intrusion detection), and/or network security prevention, including but not limited to intrusion prevention, anti-virus, URL blocking, QoS, etc. The application processor card 14 may be configured to perform one or more packet processing function(s), including but not limited to load balancing, etc. Although each application processor card 14 is illustrated as having three application processing units 30, in other embodiments, an application processor card 14 may have fewer than three (e.g., one) application processing units 30, or more than three application processing units 30. In some embodiments, an application processing unit 30 may be implemented using a processor, such as a FPGA, an ASIC, a general purpose processor, etc. Also, in some embodiments, an application processing unit 30 may include hardware, software, or combination of both. Also, in some embodiments, different application processing units 30 may be configured to perform different tasks. In some embodiments, each application processor card 14 may comprise a multi-core CPU. Also, in some embodiments, different application processing units in the application processor card 14 may be implemented using different respective CPUs.

In some embodiments, all of the components of the network appliance 10 may be accommodated in a housing, or may be physically connected to each other in a frame or in a building, so that the network appliance 10 may be deployed as a single unit at a geographical location. In one implementation, the network appliance 10 may include a chassis with a plurality of slots for detachably coupling to a plurality of I/O cards 12, and a plurality of slots for detachably coupling to a plurality of application processor cards 14. In other embodiments, one or more components of the network appliance 10 may be communicatively coupled to a remaining part of the network appliance 10 through a network (e.g., the Internet). In such cases, the components of the network appliance 10 may be deployed in different geographical locations.

Figure 2:
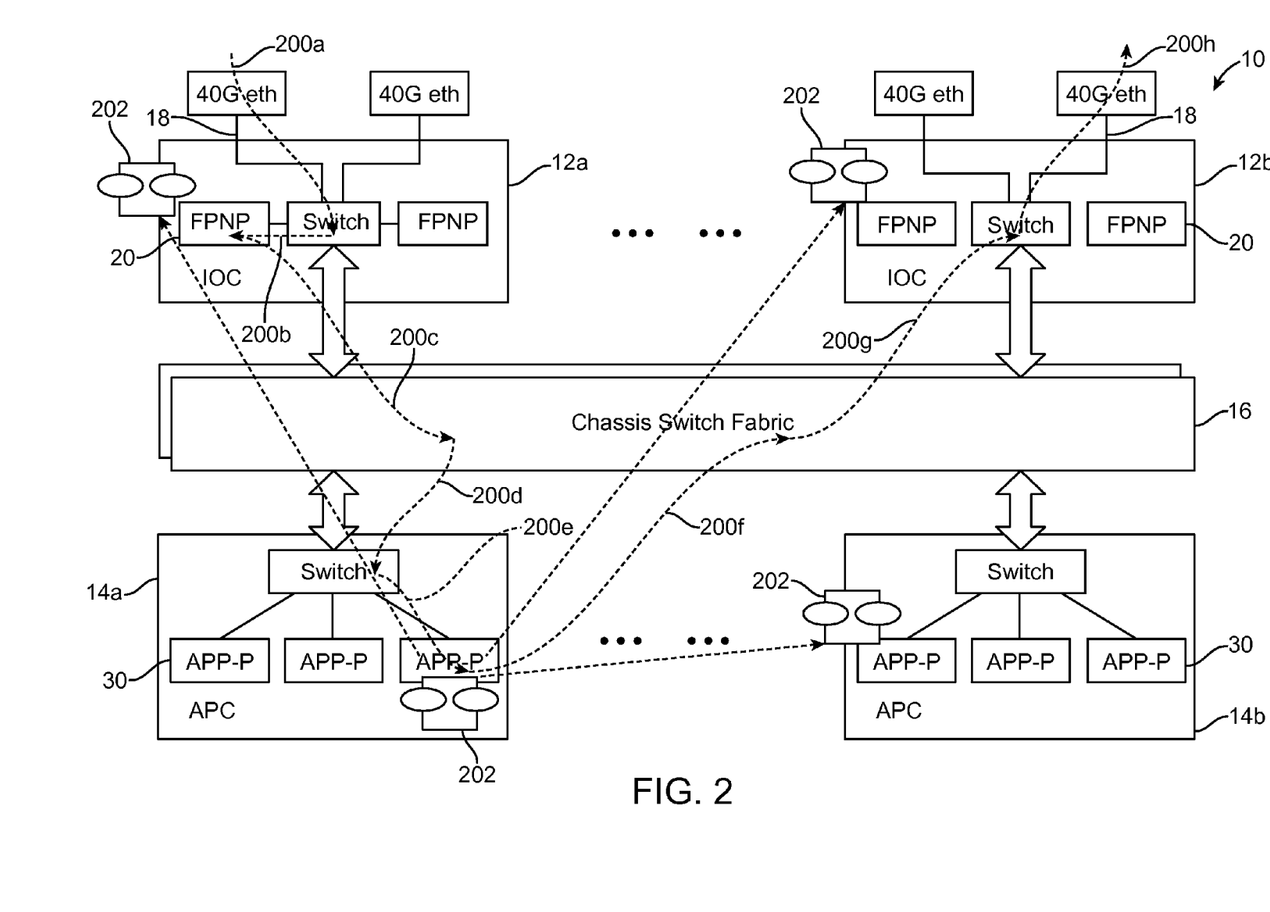
FIG. 2 illustrates the network appliance of FIG. 1, particularly showing the network appliance processing packets in a slow-path configuration.

The network appliance 10 is configured to process packets in at least two configurations—i.e., a slow-path configuration, and a fast-path configuration. FIG. 2 illustrates a processing of packets by the network appliance 10 in the slow-path configuration. First, a packet is received at one of the ports 18 at one of the I/O cards (I/O card 12a), and the packet is passed to a circuit (which may be a switch or a conductor), as represented by arrow 200a. The packet is then passed to a network processing unit 20 in the I/O card 12a, as represented by arrow 200b. The network processing unit 20 looks up its local database to see if a session was previously set up for the packet. In some embodiments, a hashing may be performed using one or more information regarding the packet, and the hash value may be used to look up a corresponding session. If there is no previous session, the network processing unit 20 then passes the packet downstream for processing in the slow-path configuration.

As shown in the figure, the packet is passed by the network processing unit 20 to the switch fabric 16, as represented by arrow 200c, which then passes the packet to one of the application processor cards 14 (application processor card 14a), as represented by arrow 200d. The packet is passed to a circuit (which may be a switch or a conductor) in the application processor card 14a, which then passes the packet to one of the application processing units 30 in the application processor card 14a, as represented by arrow 200e. In some embodiments, the I/O card 12a that received the packet may calculate a hash value using one or more information regarding the packet, and use the hash value to identify the application processing unit 30 to transmit the packet. In one implementation, the one or more information regarding the packet may be a 5-tuples that include source IP address, destination IP address, source port, destination port, and protocol information. In other embodiments, the one or more information regarding the packet may be a subset of the above information, or may have other types of information.

After the application processing unit 30 receives the packet, the application processing unit 30 may perform session lookup to see if a session can be found for the packet. If there is no session found, then the application processing unit 30 then processes the packet (e.g., performs policy lookup, anti-virus check, and/or any of other network security checks, etc.), and creates a session 202. In some embodiments, the creation of the session may be performed based on policy, ALG, NAT, etc.

After the session 202 is created, the application processing unit 30 then passes the packet to the switch fabric 16, as represented by arrow 200f. The switch fabric 16 then passes the packet to another I/O card 12b, as represented by arrow 200g. The I/O card 12b than passes the packet to a network port 18 at the I/O card 12 for egress out of the network port 18 at the I/O card 12b, as represented by arrow 200h.

In some embodiments, the created session 202 may represent a packet processing plan. For example, in some embodiments, the session 202 may have a data structure configured to represent different parameters for processing packets that belong to the same session. Information in the session 202 may be determined by one or more application processor cards 14 (e.g., by one or more application processing units 30 in a same application processor card 14, or by application processing units 30 in different application processor cards 14).

In the illustrated embodiments, the created session 202 may be transmitted by the application processor card 14a to the I/O card 12a at which the packet was received, so that the session 202 may be stored at a local database for the I/O card 12a (e.g., the local database associated with the corresponding network processing unit 20). The created session 202 may also be transmitted (e.g., via the switch fabric 16) by the application processor card 14a to the I/O card 12b at which the packet is egressed, wherein the packet may be stored at a local database for the I/O card 12b (e.g., the local database associated with the corresponding network processing unit 20 in the I/O card 12b). Session is stored at both the I/O card 12a and the I/O card 12b, so that when packet comes in from either direction (e.g., received at the I/O card 12b for egress at the I/O card 12a, or received at the I/O card 12a for egress at the I/O card 12b), the session information will be available either way at the I/O card 12a or at the I/O card 12b. As shown in the figure, the created session 202 may also be transmitted by the application processor card 14a to another application processor card 14b (e.g., through the switch fabric 16) for storage at a local database for the other application processor card 14b. For example, the application processing card 14a may identify the application processing card 14b based on hash information (e.g., 5 tuples) used in the I/O card. In some embodiments, the created session 202 may be associated with a value, which may be determined using information regarding the packet, wherein the value may be later used as an index to lookup the session 202. For example, in some embodiments, 5-tuples (e.g., source IP address, destination IP address, source port, destination port, protocol information) obtained from the packet may be used to determine a value, such as a hash value, and the created session 202 may then be stored in association with the hash value.

Figure 3:
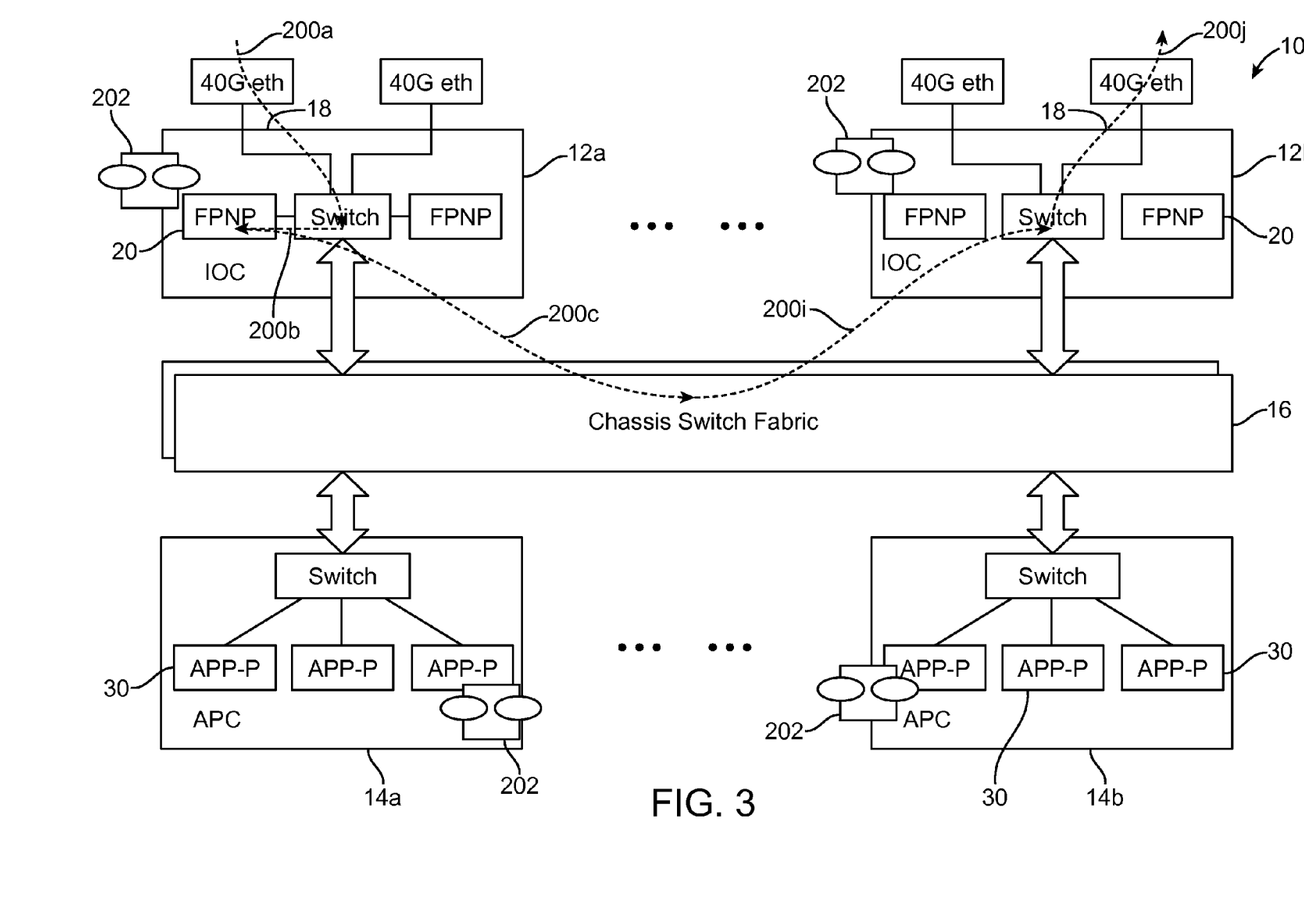
FIG. 3 illustrates the network appliance of FIG. 1, particularly showing the network appliance processing packets in a fast-path configuration.

After the session 202 has been created, the next time the network appliance 10 receives a packet that belong to the same session, the packet may be processed in the fast-path. FIG. 3 illustrates a processing of packets by the network appliance 10 in the fast-path configuration. First, a packet is received at one of the ports 18 at one of the I/O cards 12 (I/O card 12a), and the packet is passed to a circuit (which may be a switch or a conductor), as represented by arrow 200a. The packet is then passed to a network processing unit 20 in the I/O card 12a, as represented by arrow 200b. The network processing unit 20 looks up the local database for the I/O card 12a to see if a session was previously set up for the packet. If there is no previous session, the network processing unit 20 then passes the packet downstream for processing in the slow-path configuration, as discussed with reference to FIG. 2. In the illustrated example shown in FIG. 3, there is a previous session 202 created. Thus, instead of passing the packet to an application processor card 14 via the switch fabric 16, in this case, the packet is processed by one or more network processing unit(s) 20 at the I/O card 12a according to the packet processing plan prescribed by the session 202 previously stored at the local database for the I/O card 12a. The packet is then passed to the switch fabric 16 (as represented by arrow 200c), which then passes the packet to another I/O card 12b, as represented by arrow 200i. The packet is then egressed out of a port 18 at the I/O card 12b, as represented by arrow 200j. As shown in the figure, in the fast-path configuration, the packet does not need to go through processing by the application processor cards 14 to establish a new session, and thus, the processing speed for the fast-path configuration is faster than the processing speed for the slow-path configuration.

In some cases, a packet may be received from a port 18 at the I/O card 12b, and be transmitted out at a port 18 at the I/O card 12a in the opposite direction in the fast-path configuration from that shown in FIG. 3. In such cases, because the session 202 is also stored in a local database for the I/O card 12b, a network processing unit 20 at the I/O card 12b may look up the local database for the I/O card 12b to see that a session was previously set up for the packet. Accordingly, the packet is then processed by one or more network processing unit(s) 20 at the I/O card 12b according to the packet processing plan prescribed by the session 202 previously stored at the local database for the I/O card 12b. The packet is then passed to the switch fabric 16, which then passes the packet to the I/O card 12a for egress out of a port at the I/O card 12a. In other embodiments, the session may be processed by the I/O card 12a. In such cases, the network port 18 at the I/O card 12b will forward packets to the I/O card 12a for processing.

In some cases, the session 202 at the I/O card 12a may be missing when the I/O card 12a receives a new packet. In such cases, the packet will be passed to one of the application processing units 30 (e.g., based on a hash value determined from one or more information regarding (e.g., in) the new packet) at the application processor card 14a through the switch fabric 16. The application processing unit 30 may determine that there is a session because it is stored in a local database associated with the application processing unit 30. In such cases, the packet will still be processed according to a fast-path configuration. In particular, the packet will be processed according to the previously created session 202, and be passed from the application processor card 14a to the I/O card 12b through the switch fabric 16 for egressing the packet, without creating a new session. The application processor card 14a may also send back a copy of the session 202 to the I/O card 12a for storage at a local database associated with the I/O card 12a, so that the network processing unit 20 in the I/O card 12a may have access to the session 202 in the future that was previously missing.

Also, in some cases, the session 202 may prescribe packets to be processed by one or more application processing units 30. In such cases, packets may be passed to one or more application processing units 30 for fast-path processing. For example, in some embodiments, the I/O card 12a receiving the packet may perform session lookup. The I/O card 12a may find the session for the packet, wherein the session 202 may prescribe the packet to be processed by certain application processing unit 30. The packet is then forwarded to the application processor card 14 that includes the application processing unit 30 according to the session 202 along with a session ID. When the application processing unit 30 receives the packet and the session ID, the application processing unit 30 verifies the session by the session ID. If the session is found, the application processing unit 30 then processes the packet according to the session. After the packet is processed, the application processing unit 30 then passes the packet to an I/O card 12 for egressing the packet.

As illustrated in the above example, creating the session 202 is advantageous because the session 202 contains all information of what is to be done for a particular packet. As the packet is being processed in the slow-path configuration, the network appliance 10 collects information of what needs to be done for the packet. The network appliance 10 sets up the session 202 (containing information on what needs to be done on packet). This way, future packets do not need to go through the slow-path processing, and network appliance 10 can look up session to process future packets in the fast-path configuration.

As discussed, during the slow-path packet processing configuration, a session 202 is created. In the process, different network parameters may be determined. There may be different types of RTO representing different network parameters. By means of non-limiting example, different RTO types may represent flow session, VPN SA, application layer gateway (ALG) Gate, Cone network address translation (NAT) mapping, session limit, AD counter, syn attack counter, Gate with wildcard, IP action entry, etc., respectively.

Figure 4:
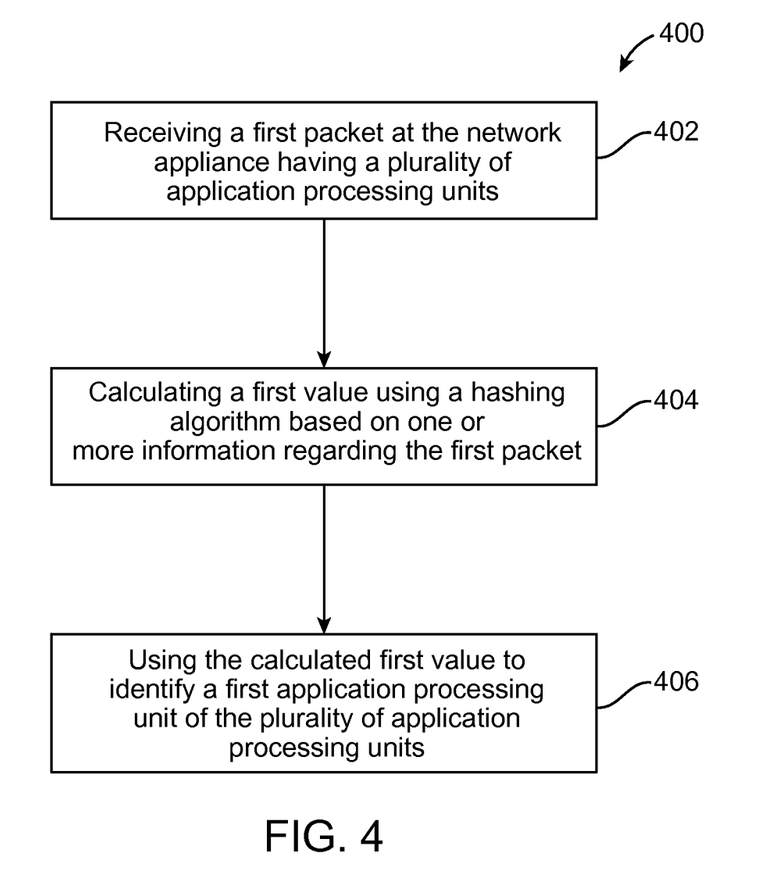
FIG. 4 illustrates a method of packet processing in accordance with some embodiments.

In some embodiments, RTOs may be stored at different local databases for the different application processing units 30 in a distributed manner. In such configuration, each application processing unit 30 has a local database which may be a subset of a hypothetical global database. In the distributed database configuration, because there is no central management for managing all information, a special technique is needed to identify a local database that is associated with a certain application processing unit 30 in order to store, retrieve, and operate on information stored therein. FIG. 4 illustrates a method 400 of processing a packet to identify an application processing unit 30 in a distributed database configuration. First, a packet is received by the network appliance 10 (Item 402). Next, a hash value is calculated using a mathematical algorithm (e.g., hashing algorithm) based on one or more information regarding the packet (item 404). In some embodiments, the calculating of the hash value may be performed by one of the application processing units 30, or by one of the network processing units 20, or by both. By means of non-limiting examples, the one or more information regarding the packet may be one or a combination of a source IP address, a destination IP address, a source port, a destination port, and protocol information. After the hash value is obtained, the hash value may then be used to identify the application processing unit 30 (Item 406). For example, in some embodiments, the hash value itself may be the identification of the application processing unit 30. In other embodiments, the hash value may be used as an index to look up a corresponding identification of an application processing unit 30. In the illustrated embodiments, the hash value is used to store and/or lookup information stored in a distributed database system associated with the network appliance 10 (e.g., to identify the application processing unit 30 that stores a certain information). Thus, the hash value is different from the session-lookup hash value.

In some embodiments, after the application processing unit 30 has been identified in the distributed database system, the identified application processing unit 30 (e.g., its corresponding local database) may then be used to store information regarding the packet. In other embodiments, information already stored in the corresponding local database of the application processing unit 30 may be retrieved after the application processing unit 30 has been identified. In further embodiments, information stored in the corresponding local database of the application processing unit 30 may be operated on (e.g., updated, deleted, etc.) after the application processing unit 30 has been identified.

It should be noted that because each application processing unit 30 has a corresponding local database associated therewith, the act of identifying the application processing unit 30 may be accomplished by determining the identification of the application processing unit 30, or the identification of the local database associated with the application processing unit 30 (which may be the same or different). In some embodiments, the local database associated with the corresponding application processing unit 30 may be considered to be a part of the application processing unit 30.

Figure 5:
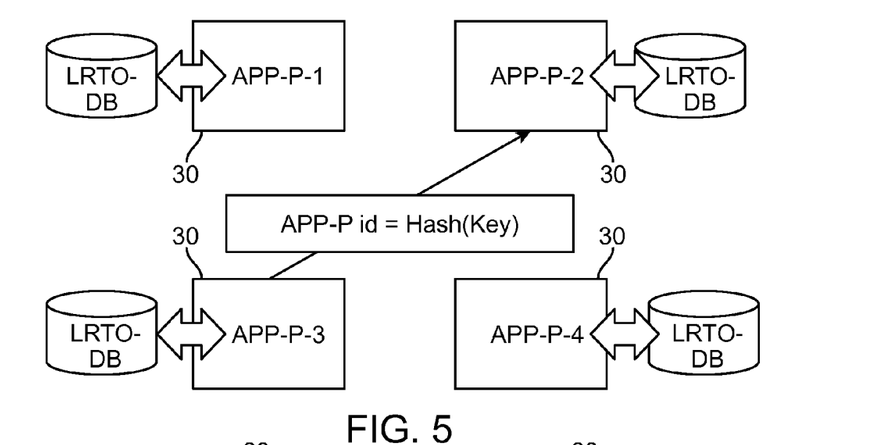
FIG. 5 illustrates a distributed database configuration for the network appliance of FIG. 1.

In the distributed database configuration, every RTO is stored only in one local RTO database for a corresponding one application processing unit 30, which may be uniquely identified using a hash value, like that shown in FIG. 5. In other embodiments, every RTO may be stored in a number of local RTO databases (e.g., for redundancy purpose), but the number is fewer than the total number of RTO databases for the entire network appliance 10 so that the system may still be considered a distributed database system, but not a fully synchronized database system.

In the distributed database system shown in FIG. 5, one application processing unit 30 ("APP-P-3" in the example) may retrieve information from a local database of another application processing unit 30 ("APP-P-2" in the example) by first identifying the database from which the information is to be retrieved. Such may be accomplished by calculating a hash value using a hashing algorithm based on a key, like that discussed with reference to the method of FIG. 4. For example, the hashing algorithm may use a subset of values in the key, or all of the values in the key to calculate the hash value. The hash value may then be used to identify the database from which the information is to be retrieved. In some embodiments, the hash value itself is the identification of the database. In other embodiments, the hash value may be an index that can be used to look up an identification of the database (such as, through a lookup table). Because each application processing unit 30 has a corresponding local database associated therewith, identification of the database may be accomplished by identifying the application processing unit 30, or vice versa. In such cases, the hash value may represent both the identification of the database and the identification of the corresponding application processing unit 30. Thus, in this specification, the identification of the database and the identification of the application processing unit 30 may be the same, and a reference to an identification of an application processing unit may refer to an identification of the database that corresponds with the application processing unit, and vice versa.

After the database from which the information is to be retrieved has been identified, the key may then be used to retrieve the information from the database. In some embodiments, a part of a key may be used to calculate the hash value for identifying the database/application processing unit 30, and then the full key is used (e.g., the fully key may be used directly as an index, or may be hashed to obtain a hash value, which is then used as an index) to look up the desired information from the database.

In some embodiments, the key described above for use in the distributed database operation for the network appliance 10 may be constructed using a 5-tuples that includes (1) a source IP address, (2) a destination IP address, (3) a source port, (4) a destination port, and (5) protocol information. Any information in this 5-tuples may have a fixed value, a range of values, or a "wildcard" identifier. In some embodiments, a key has at least one fixed value in the 5-tuples. In some embodiments, if all 5-tuples are fixed, then the 5-tuples are used as the key. Such key may be used to look up information regarding session, VPN SA, etc. In other embodiments, if a subset of the values in the 5-tuples is fixed, then only the fixed values (or a subset of the fixed values) in the 5-tuples may be used as the key. For example, if the destination IP address is fixed, then the destination IP address may be used as the key. Such key may be used to look up information regarding corn NAT, ALG gate, destination IP-based session limit, etc. In another example, if the source IP address is fixed, then the source IP address is used as the key. Such key may be used to look up information regarding Cone NAT, ALG gate, source IP-based session limit, etc. In other embodiments, in a rare situation, a key may contain no fixed value (e.g., each of the 5-typles is either a range of value or a wild card value). In such cases, the information may be fully populated to all local RTO databases (like that in a fully synchronized database configuration).

Figure 6:
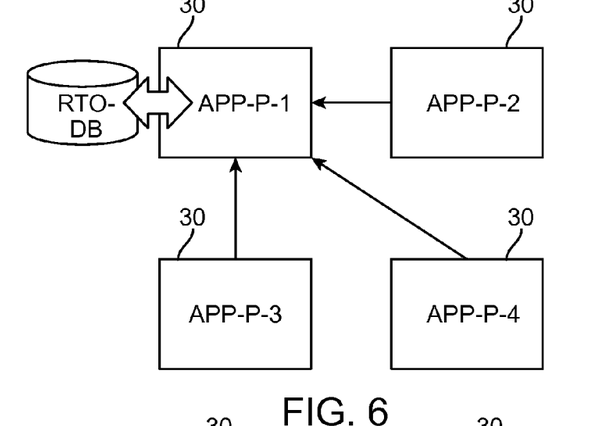
FIG. 6 illustrates a centralized database configuration in contrast with the distributed database configuration.
Figure 7:
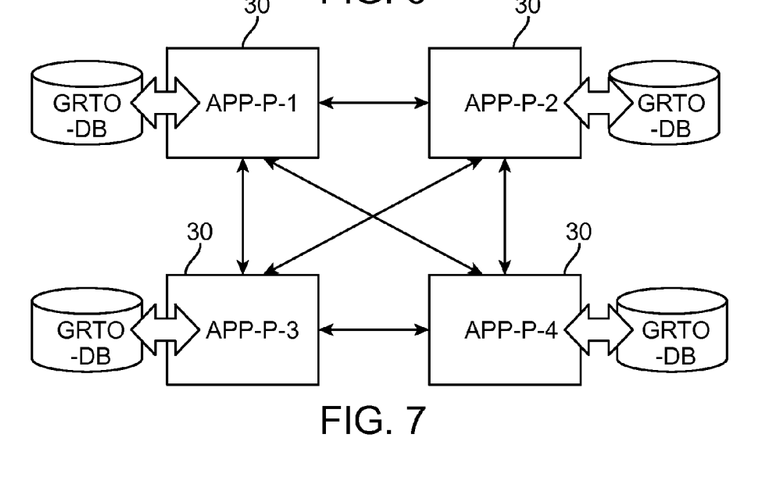
FIG. 7 illustrates a fully synchronized database configuration in contrast with the distributed database configuration.

As illustrated in the above embodiments, the distributed database configuration of the network appliance 10 is advantageous because its capacity may linearly scale up along with the number of application processing units 30. Also, the database operations overhead remains constant while the number of application processing units 30 may increase. Furthermore, such distributed database would require less resource for maintenance and synchronization compared to a centralized database configuration (in which all information is stored in one centralized database like that shown in FIG. 6) and a fully synchronized database configuration (in which each RTO database has a copy of a same information so that the information can be locally retrieved at each application processing unit 30 like that shown in FIG. 7). This is because in the network appliance 10, RTO information are stored and managed locally by the respective application processing unit 30. Thus, unlike the centralized database in which a centralized CPU keeps track of all information in all application processing units to have a view of the whole system, and distributes work accordingly, in the network appliance 10, there is no need for any centralized management. Also, the distributed database configuration of the network appliance 10 is advantageous because even if a network processing unit 30 is down, the network appliance 10 may still be functional because other network processing units 30 may continue to perform packet processing based on the distributed database configuration described previously. This is in contrast to the centralized database configuration in which if the centralized CPU is down, then the entire system becomes non-functional.

In the distributed database configuration, because there is no centralized CPU that manages everything, and because network information are stored respectively at different local databases for the respective application processing units 30, the network appliance 10 is configured to lookup network information (e.g., network parameters) from the different local databases. For example, in some embodiments, when a packet is received by the network appliance 10, the 5-tuples obtained from the packet is hashed to obtain a hash value. The hash value is used to identify the local database that contains the desired network information. A query is then sent (e.g., by an application processing unit 30 or a network processing unit 20) to an application processing unit 30 that hosts the identified (based on the hash value) local database to get the desired network information. By means of non-limiting examples, the network information may be a counter, a mapping, session counter, session limit, etc. For example, for session setup, the query may ask for a counter for a current session. If the counter for the current session returned by the database is less than a prescribed maximum value, then the application processing unit 30 may set up a session for the packet. Also, in some embodiments, the session counter may be updated in the local database.

Figure 8:
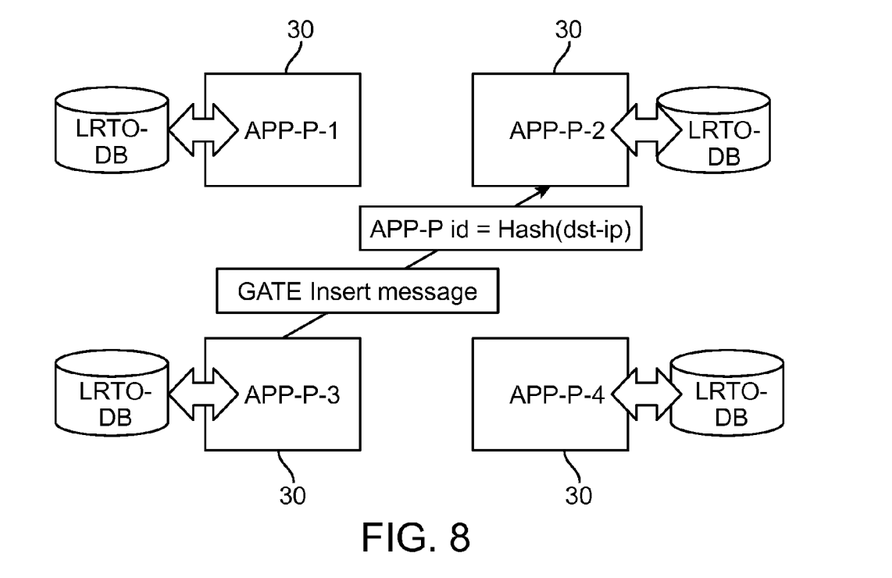
FIG. 8 illustrates an example of packet processing in a distributed database.

FIG. 8 illustrates an example of a RTO database operation in a distributed database configuration that involves ALG Gate (e.g., FTP) insert. Initially, no Gate is setup for a particular packet. As part of the slow-path processing, it may be determined that a Gate needs to be created. In some embodiments, a Gate may be created by one of the application processing units 30 ("APP-P-3" in the example). Also, in some embodiments, the I/O card may use the 5-tuple key (e.g., the key itself, or a hash value of it) to identify the application processing unit 30. In the illustrated example, the created Gate may be associated with a 5-tuple key derived from a packet for which the Gate is created. The 5-tuple key may have the format: [dst-ip, *, dst-port, src-port, protocol], wherein "dst-ip" represents destination IP address, "dst-port" represents destination port, "src-port" represents source port, and "*" represents a wildcard. The 5-tuple key represents an unique Gate ID for the created Gate. Next, a portion of the 5-tuple key ("dst-ip") is used to calculate a hash value for identifying a local RTO database at one of the application processing units 30 for storing the created Gate. In some embodiments, the calculating of the hash value may be performed by APP-P-3. In the example, the calculated hash value may represent an identification of another application processing unit 30 ("APP-P-2" in the example). In such cases, the Gate together with its globally unique Gate ID are then sent from APP-P-3 to APP-P-2 for storage at the local database for APP-P-2.

In some embodiments, when a new packet comes in, the network appliance 10 may retrieve the Gate information in the database hosted by APP-P-2 for the new packet. For example, in some embodiments, when a new packet is received by the network appliance 10, the network appliance 10 may not find a session for the packet. The network appliance 10 may then determine whether there is a Gate created for the packet. If there is a Gate, then the network appliance 10 may create a session. The application processing unit 30 (e.g., APP-P-3) may use the "dst-ip" part of the key (determined from processing the newly received packet) to calculate a hash value. The hash value is then used to identify the database at which the Gate information is stored. In this example, the identified database is the local database associated with the application processing unit 30 "APP-P-2". The application processing unit "APP-P-3" may then send a retrieval message along with the 5-tuple key to APP-P-2. When APP-P-2 receives the query and the 5-tuple key from APP-P-3, APP-P-2 looks up its RTO database using the 5-tuple key to see if there is a match. If so, the APP-P-2 may then send back the Gate information back to APP-P-3, and APP-P-3 may then create a session for the packet.

Also, in some embodiments, the Gate information stored at the local database associated with one of the application processing units 30 may be operated on (e.g., it may be updated, deleted, etc.). For example, in some embodiments, the application processing unit 30 (e.g., APP-P-3) may use the "dst-ip" part of the key to calculate a hash value. The hash value is then used to identify the database at which the Gate information is stored. In this example, the identified database is the local database associated with the application processing unit 30 "APP-P-2". The application processing unit "APP-P-3" may then send an operational message (e.g., an update or delete message) to APP-P-2 with the Gate ID (which is the full key). When APP-P-2 receives the Gate ID from APP-P-3, APP-P-2 looks up its RTO database to see if there is a match. If so, the APP-P-2 may then perform the requested operation, may then send back an acknowledgement message back to APP-P-3 after the operation is completed.

It should be noted that RTO information is not limited to the Gate information described in the previous example, and that there may be other types of RTO information. For example, RTO information may include information regarding a flow session, in which case, the 5-tuples may be used as the key (e.g., in a hashing operation) for identifying the database/corresponding application processing unit 30 that has the flow session information.

In another example, RTO information may include information regarding VPN SA, in which case, the 5-tuples may be used as the key (e.g., in a hashing operation) for identifying the database/corresponding application processing unit 30 that has the VPN SA information. In other embodiments, the source IP address and/or the destination IP address may be used as the hash key to locate the application processing unit to perform the RTO lookup.

In another example, RTO information may include information regarding full Gate, in which case, the 5-tuples may be used as the key (e.g., in a hashing operation) for identifying the database/corresponding application processing unit 30 that has the full Gate information.

In another example, RTO information may include information regarding session limit that is either source IP based or destination IP based. In such case, the source IP address or the destination IP address in the 5-tuples may be used (e.g., in a hashing operation) for identifying the database/corresponding application processing unit 30 that has the session limit information.

In another example, RTO information may include information regarding AD counter. In such case, the source IP address or the destination IP address in the 5-tuples may be used (e.g., in a hashing operation) for identifying the database/corresponding application processing unit 30 that has the AD counter information.

In still another example, RTO information may include information regarding syn attack (such as syn attack counter). In such case, the source IP address or the destination IP address in the 5-tuples may be used (e.g., in a hashing operation) for identifying the database/corresponding application processing unit 30 that has the syn attack information.

In another example, RTO information may include information regarding Cone NAT (e.g., mapping information). In such cases, there may be two RTO entries, one for forward mapping, and another one for reverse mapping. The original source IP address may be used as the key (e.g., in a first hashing operation) for identifying the database/corresponding application processing unit 30 that has the forward mapping information, and the "NATed" source IP address may be used as the key (e.g., in a second hashing operation) for identifying the database/corresponding application processing unit 30 that has the reverse mapping information.

In some embodiments, except for session RTOs and SA RTOs, all of the RTOs with the same destination IP address or source IP address may be stored in the same local RTO database. Also, in some embodiments, for a given packet with a fixed destination IP address and source IP address, two RTO database queries may be issued by an application processing unit 30 to retrieve all of the relevant RTOs for the packet. For example, one query may be issued to an application processing unit (e.g., APP-P-1) that is identified by hashing the destination IP address in the key, and another query may be issued to another application processing unit 30 (e.g., APP-P-2) that is identified by hashing the source IP address in the key.

Figure 9:
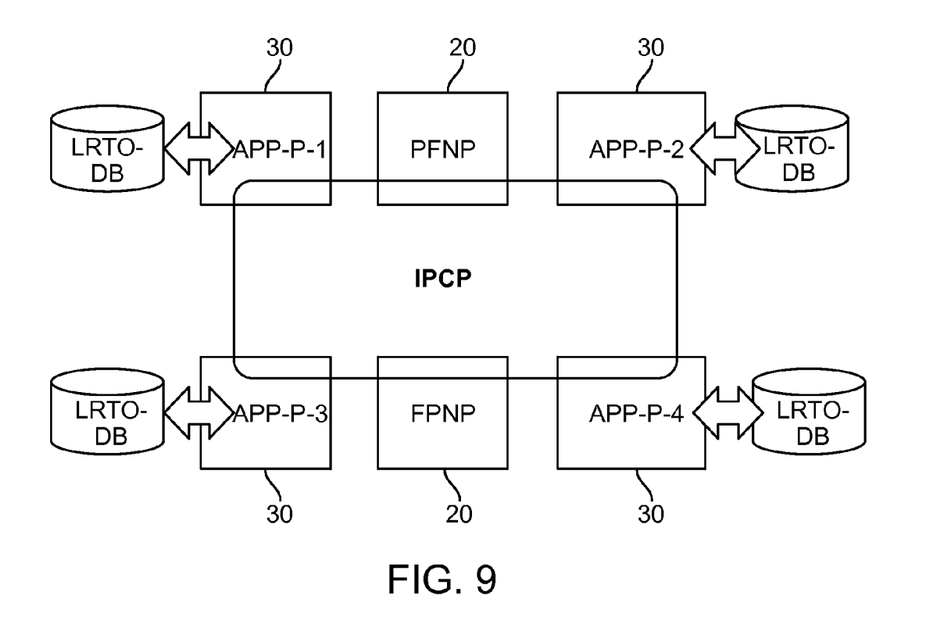
FIG. 9 illustrates an inter-processor communication system that may be implemented in the network appliance of FIG. 1.

As discussed and illustrated above, one or more network processing units 20 and one or more application processing units 30 in the network appliance 10 are configured to communicate with each other through the switch fabric 16. In some embodiments, the switch fabric 16 of the network appliance 10 may include a logical bus for interconnecting all of the network processing units 20 and the application processing units 30. In some embodiments, the network appliance 10 may utilize a protocol (e.g., an Inter Processor Communication Protocol (IPCP), which is a transport layer protocol that provides a mechanism to deliver messages between two points) for supporting this interconnection (FIG. 9). The protocol may support one or a combination of P2P communication, P2MP communication, broadcast, synchronized communication, asynchronized communication, reliable communication, unreliable communication.

Computer System Architecture

Figure 10:
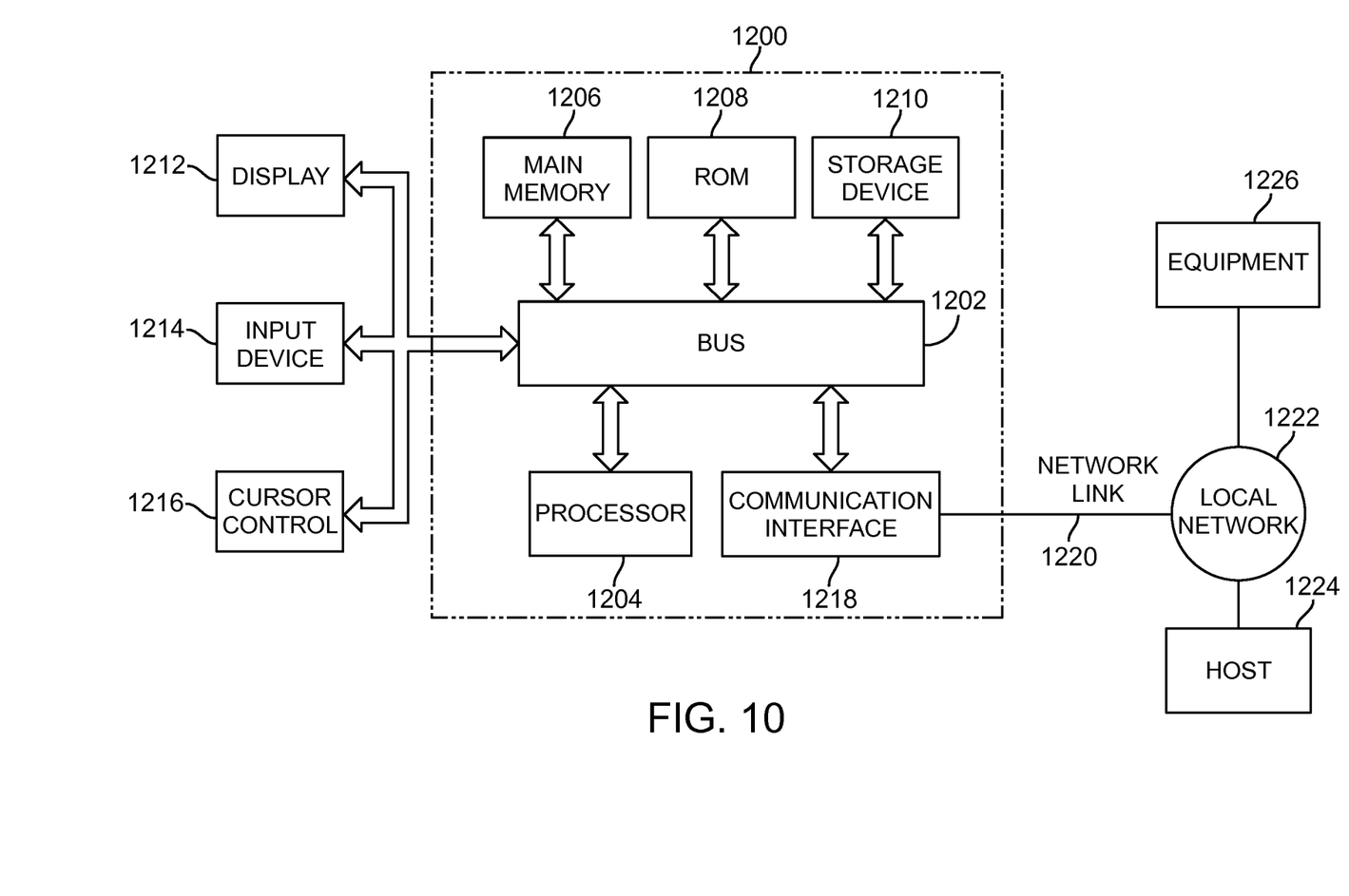
FIG. 10 illustrates an example of a computer system with which embodiments described herein may be implemented.

As discussed above, the network appliance 10 includes a plurality of application processing units 30 in one or more application processor cards 14. In other embodiments, an application processing unit 30 or an application processor card 14 may be implemented using a computer system. FIG. 10 is a block diagram that illustrates an embodiment of a computer system 1200 upon which embodiments described herein may be implemented. For example, in some embodiments, the computer system 1200 may be used to implement one or more functions of an application processor card 14, or one or more functions of an application processing unit 30, described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network (s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method performed by a network appliance having a plurality of application processing units, comprising:
    receiving a first packet at the network appliance;
    calculating a first value using a mathematical algorithm based on one or more information regarding the first packet; and
    using the calculated first value to identify a first application processing unit of the plurality of application processing units in the network appliance;
    wherein at least two of the application processing units are configured to perform different respective packet processing functions;
    wherein the method further comprises creating a packet processing session, wherein the packet processing session is created by one of the application processing units; and
    wherein the network appliance also includes a plurality of I/O cards, and the method further comprises storing the packet processing session in a first resource repository for one of the I/O cards at which the first packet is received.

2. The method of claim 1, wherein the one or more information comprises one or a combination of a source IP address, a destination IP address, a source port identifier, a destination port identifier, and protocol information.

3. The method of claim 1, wherein the network appliance includes a plurality of application processing cards, and the plurality of application processing units are parts of the application processing cards.

4. The method of claim 1, further comprising retrieving data from the identified first application processing unit based at least in part on a set of information regarding the first packet, the set of information being a superset of the one or more information used to calculate the first value.

5. The method of claim 4, wherein the set of information for retrieving the data comprises source IP address, destination IP address, source port, destination port, and protocol information, and wherein the one or more information for identifying the first application processing unit comprises a subset of the set of information.

6. The method of claim 1, further comprising receiving data from the identified first application processing unit, wherein the act of receiving the data is performed by a second application processing unit of the plurality of application processing units in the network appliance that is different from the first application processing unit identified using the calculated first value.

7. The method of claim 1, wherein the application processing units have respective resource repositories associated therewith, and the method further comprises storing data regarding the first packet at one of the resource repositories that is associated with the identified first application processing unit.

8. The method of claim 7, wherein at least one of the resource repositories does not have a copy of the data.

9. The method of claim 1, further comprising:
    receiving a second packet at network appliance;
    calculating a second value based on one or more information regarding the second packet; and using the calculated second value to identify a second application processing unit of the plurality of application processing units.

10. The method of claim 1, further comprising:
    retrieving data stored in a resource repository that is associated with the identified application processing unit.

11. The method of claim 1, wherein the packet processing session is also stored in a second resource repository for another one of the I/O cards at which the first packet is egressed.

12. The method of claim 1, wherein the network appliance is configured to perform packet processing in either a slow-path configuration or a fast-path configuration, and the act of calculating the first value and the act of using the calculated first value to identify the first application processing unit are performed while processing the first packet in the slow-path configuration.

13. The method of claim 1, further comprising using the first value to store and/or lookup information.

14. A network appliance, comprising:
    a plurality of processing units that are communicatively connected to each other;
    wherein a first processing unit of the plurality of processing units is configured for:
        calculating a first value using a mathematical algorithm based on one or more information regarding a first packet;
        using the calculated first value to identify a second processing unit of the plurality of processing units;

retrieving data stored in a resource repository that is associated with the identified second processing unit; and creating a packet processing session based at least in part on the retrieved data;

wherein the network appliance further comprises a plurality of I/O cards, wherein the first packet is received at a first one of the I/O cards, and is egressed at a second one of the I/O cards, and wherein the packet processing session is stored in the first one of the I/O cards at which the first packet is received, and in the second one of the I/O cards at which the first packet is egressed.

15. The network appliance of claim 14, wherein the one or more information comprises one or a combination of a source IP address, a destination IP address, a source port identifier, a destination port identifier, and protocol information.

16. The network appliance of claim 14, further comprising a plurality of application processing cards, and the plurality of processing units are parts of the application processing cards.

17. The network appliance of claim 14, wherein the first processing unit is configured for retrieving data from the identified second processing unit based at least in part on a set of information regarding the first packet, the set of information being a superset of the one or more information used to calculate the first value for identifying the second processing unit.

18. The network appliance of claim 17, wherein the set of information for retrieving the data comprises source IP address, destination IP address, source port, destination port, and protocol information, and wherein the one or more information for identifying the second processing unit comprises a subset of the set of information.

19. The network appliance of claim 17, wherein the first processing unit is configured for retrieving data from the identified second processing unit by retrieving data from a resource repository associated with the second processing unit.

20. The network appliance of claim 14, further comprising respective local databases associated with the processing units, wherein one of the resource repositories that is associated with the identified second processing unit is configured for storing data regarding the first packet.

21. The network appliance of claim 20, wherein at least one of the resource repositories does not have a copy of the data.

22. The network appliance of claim 14, wherein the first processing unit is configured for:
calculating a second value based on one or more information regarding a second packet; and
using the calculated second value to identify a third processing unit of the plurality of processing units.

23. The network appliance of claim 14, wherein the network appliance is configured to perform packet processing in either a slow-path configuration or a fast-path configuration, and the first processing unit is configured to perform the act of calculating the first value and the act of using the calculated first value to identify the second processing unit while processing the first packet in the slow-path configuration.

24. The network appliance of claim 14, wherein the first processing unit comprises a first application processing unit, and the second processing unit comprises a second application processing unit.

25. The network appliance of claim 14, wherein the first processing unit comprises a network processing unit in an I/O card, and the second processing unit comprises an application processor unit in an application processor card.

26. The network appliance of claim 14, further comprising a non-transitory medium storing information in association with the first value.

27. A method performed by a network appliance having a first application processing unit, comprising:
receiving a first packet at the network appliance;
calculating a first value based on one or more information regarding the first packet; and
using the calculated first value to identify a second application processing unit;
wherein the act of using the calculated first value to identify the second application processing unit is performed by the first application processing unit in the network appliance, the second application processing unit being identified based on an identification algorithm by the first application processing unit as having data that is needed by the first application processing unit and that is not stored in a first resource repository associated with the first application processing unit; and
wherein the method further comprises receiving, by the first application processing unit, the data from the identified second application processing unit.

28. The method of claim 27, wherein the first application processing unit comprises an application processing card.

29. The method of claim 27, wherein the first application processing unit comprises the first resource repository.

30. The method of claim 27, wherein the second application processing unit has a second resource repository associated therewith, and wherein information for use by the network appliance are stored at least in the first and second resource repositories in a distributed manner.

31. A network appliance, comprising:
a first processing unit that are communicatively connected to a second processing unit;
wherein the first processing unit is configured for:
calculating a first value based on one or more information regarding a first packet;
using the calculated first value to identify the second processing unit; and
wherein the first application processing unit is configured to identify the second application processing unit based on an identification algorithm as having data that is needed by the first application processing unit and that is not stored in a first resource repository associated with the first application processing unit; and
wherein the first application processing unit is also configured to receive the data from the identified second application processing unit.

32. The network appliance of claim 31, wherein the first application processing unit comprises an application processing card.

33. The network appliance of claim 31, wherein the first application processing unit comprises the first resource repository.

34. The network appliance of claim 31, wherein the second application processing unit has a second resource repository associated therewith, and wherein information for use by the network appliance are stored at least in the first and second resource repositories in a distributed manner.

* * * * *